United States Patent
Ceker et al.

(10) Patent No.: US 9,813,875 B2
(45) Date of Patent: Nov. 7, 2017

(54) AD-HOC COMMUNITY CONTEXT AWARENESS FOR MOBILE DEVICE

(71) Applicant: Intel Corporation, Santa Clara, CA (US)

(72) Inventors: Hayreddin Ceker, Buffalo, NY (US); Bahadir I Aydin, Portland, OR (US); Abdullah Sevincer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/087,038

(22) Filed: Mar. 31, 2016

(65) Prior Publication Data

US 2017/0289769 A1    Oct. 5, 2017

(51) Int. Cl.
*H04W 24/00* (2009.01)
*H04W 4/04* (2009.01)
*G06F 17/30* (2006.01)

(52) U.S. Cl.
CPC ........ *H04W 4/04* (2013.01); *G06F 17/30528* (2013.01); *G06F 17/30979* (2013.01)

(58) Field of Classification Search
CPC ......... H04W 4/02; H04W 4/04; H04W 4/206; H04M 4/206; H04M 1/72572; H04M 1/72566; G06Q 30/0224; G06Q 30/0261; H06Q 30/0267; G06F 17/30528; G06F 17/30979
USPC .......... 455/410, 310, 414.1, 456.3; 709/201; 705/51
See application file for complete search history.

(56) References Cited

U.S. PATENT DOCUMENTS

| | | | | | |
|---|---|---|---|---|---|
| 8,179,321 | B2 * | 5/2012 | Rani | ....................... | G01S 19/14 342/357.52 |
| 8,233,701 | B2 * | 7/2012 | Frakes | ................. | G06K 9/3216 382/154 |
| 8,266,082 | B2 * | 9/2012 | Lu | ........................... | H04L 67/22 706/12 |
| 8,352,546 | B1 * | 1/2013 | Dollard | ................... | H04L 67/24 709/203 |
| 9,417,691 | B2 * | 8/2016 | Belimpasakis | ......... | G06F 3/011 |
| 2004/0209602 | A1 * | 10/2004 | Joyce | ................. | G06Q 20/3224 455/414.1 |
| 2007/0270166 | A1 * | 11/2007 | Hampel | .............. | H04L 12/5865 455/456.3 |
| 2007/0293212 | A1 * | 12/2007 | Quon | ................ | H04M 3/42365 455/420 |

(Continued)

*Primary Examiner* — Mahendra Patel
(74) *Attorney, Agent, or Firm* — Schwegman Lundberg & Woessner, P.A.

(57) ABSTRACT

Aspects of the disclosure are directed to solutions for determining context for a mobile computing device. The context represents a current user activity or environment in which the mobile device is used. The device generates a query for transmission to a remote community context service in response to a determined need to obtain community context information, such as when the device is unable to determine context with a sufficient confidence measure. Community context information is obtained from the remote community context service. The community context information is based on a remote context determination of at least one other mobile computing device determined to be similarly situated to the first computing device. The device's current context may be updated based on the community context information.

25 Claims, 9 Drawing Sheets

(56) References Cited

U.S. PATENT DOCUMENTS

| | | | | |
|---|---|---|---|---|
| 2009/0005968 A1* | 1/2009 | Vengroff | ............ | G06F 17/3087 701/425 |
| 2009/0131080 A1* | 5/2009 | Nadler | .................. | G06Q 30/02 455/456.3 |
| 2009/0327341 A1* | 12/2009 | Fong | ................ | G06F 17/30528 |
| 2011/0105097 A1* | 5/2011 | Tadayon | ............... | H04W 4/025 455/418 |
| 2013/0073473 A1* | 3/2013 | Heath | .................... | G06Q 30/02 705/319 |
| 2014/0032572 A1* | 1/2014 | Eustice | ............... | G06F 17/2785 707/748 |
| 2014/0100835 A1* | 4/2014 | Majumdar | ........... | G06Q 10/047 703/11 |
| 2014/0187269 A1* | 7/2014 | Zinin | ..................... | H04W 4/04 455/456.3 |
| 2014/0222748 A1* | 8/2014 | Mermoud | ............. | H04L 41/142 706/52 |
| 2014/0229503 A1* | 8/2014 | Li | ..................... | G06F 17/30038 707/770 |
| 2014/0230016 A1* | 8/2014 | Chaudhri | .......... | G06F 17/30017 726/3 |
| 2017/0147722 A1* | 5/2017 | Greenwood | ........ | G06F 17/5009 |

* cited by examiner

AD-HOC COMMUNITY CONTEXT AWARENESS FOR MOBILE DEVICE

TECHNICAL FIELD

Embodiments described herein generally relate to information processing and mobile computing and, more particularly, to determining context from sensed information.

BACKGROUND

Context awareness in mobile devices relates to the user's or device's current activity or environment, referred to as a context state. A group of context states comprise a snapshot of the current context, such as location, user activity, and the surrounding environment. This snapshot is formally called a state vector, which contains a collection of context states describing the current context. Context states may be used as conditions for applying certain rules that control the mobile device, or another device such as an Internet of things (IoT)-enabled device.

In practice, mobile computing devices are frequently in situations where it is difficult for a context-finding algorithm to converge on a context determination with high confidence. A solution is needed to improve context determination.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to utilizing data captured by a mobile computing device to determine the present context in which the device, or the user of the device, resides. Captured data in this description of the embodiments is data, storable in at least one non-transitory tangible medium, representing a physical event as sensed by one or more transducers. Examples of captured data include (without limitation) video data, audio data, device positional data (e.g., from GPS or terrestrial trilateration via radio signal), motion/acceleration data (e.g., via accelerometer or gyroscope), illumination data, pressure data, temperature data, device orientation data (e.g., via magnetometer or other compass), motion detection data, etc. Captured data may also include biometric data, such as heart rate, perfusion, electrocardiogram information, neural signaling, and the like.

A mobile device may take any of a variety of device types. For instance, it may be a multi-functional device such as a smartphone, tablet, laptop, smartwatch, wearable form factor (e.g., smart glasses or a device embedded in garment), etc. A computing device may have a variety of integrated data capture devices, or may be interfaced with a distinctly-housed data capture device, such as a video camera, sound recorder, and security camera, security access device such as a doorbell, motion or perimeter breach detector, door lock, or other access control system. Moreover, a data capture device may constitute an external, wearable, or implantable medical or fitness-monitoring device. Examples include heart rate monitors, infusion pumps, electrocardiogram instruments, blood pressure instruments, ultrasound instruments, automated external defibrillators (AEDs), data loggers, motion monitors, pacemakers, implantable cardioverter-defibrillators (ICDs), etc. A data capture device may participate in Internet-of-things (IoT networking.

Figure 1:
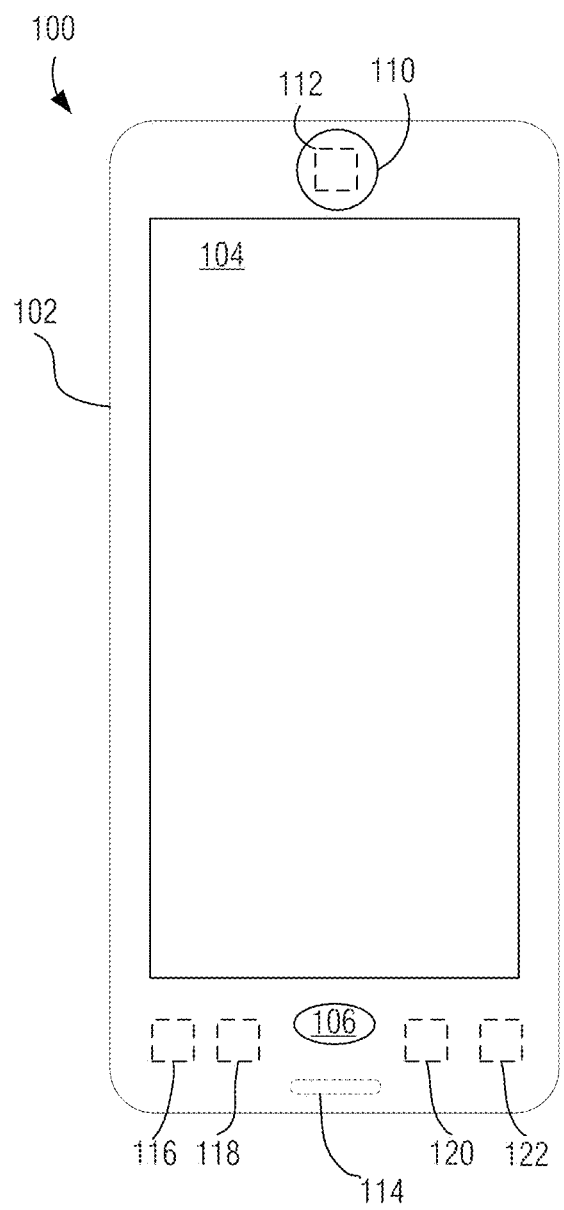
FIG. 1 is a block diagram illustrating some of the components of an example computing device according to an embodiment of the invention.

FIG. 1 is a block diagram illustrating some of the components of an example computing device 100 according to an embodiment. Computing device 100 is illustrated as a smartphone in this example, through it will be understood that computing device 100 is representative of other types of computing devices, which may have more or fewer data capture devices or other features than exemplary computing device 100. Computing device 100 has a housing 102 that encloses the interior components. Housing 102 may provide access to the interior of device 100 to some degree. For instance, in devices with a user-replaceable battery, flash memory card, or subscriber identity module (SIM) card, housing 102 may include a user-removable cover. In devices having a design that does not facilitate user access to the interior, housing 102 may nonetheless have a provision for permitting access to technicians so that certain components may be repaired or replaced if needed.

Computing device 100 further includes touchscreen 104, which may form a part of the overall enclosure of device 100 in cooperation with housing 102. Touchscreen 104 includes hardware that functions as an output device (e.g., an LED screen for visual display, power and controller circuitry, etc.), and an input device generally layered over the visual display and formed from a suitable touch or proximity-sensitive technology (e.g., capacitive, resistive, optical, ultrasonic, etc.), along with the corresponding detection and power circuitry. Additionally, computing device 100 includes user input device 106, which in this example represents one or more user-operable input devices, such as button(s), keypad, keyboard, trackpad, mouse, etc.

As further depicted in FIG. 1, computing device 100 has several data capture devices, such as sensing transducers, the physical stimulation of which produces signaling that may be sampled, digitized, and stored as captured data. Camera 110 includes an image sensor 112, along with additional hardware for digitizing, processing, and storing portions of the image sensor 112 output. Camera 110 also includes optics that may form a portion of housing 102. Camera 110 may record still images, motion video, or both.

Microphone 114 includes audio capture circuitry that samples, digitizes, and stores portions of the signaling produced by microphone 114 in response to sensed acoustic stimulus. Microphone 114 is typically activated together with camera 110 when data capture device 100 is operated to record videos.

Global positioning system (GPS) receiver 116 includes an antenna and radio receiver circuitry to receive multiple signals being broadcast by a constellation of Earth-orbiting satellites, along with processing circuitry to discern the current position on the Earth of data capture device 100. Accelerometer 118 includes a multi-axis sensor that produces signaling in response to changes in motion, and electronics to sample and digitize that signaling. Magnetometer 120 includes sensors and supporting circuitry that detect the direction and intensity of the ambient magnetic field, or any externally-applied magnetic fields. Biometric sensor 122 includes an array of sensors for measuring a biometric indicator, such as a user's fingerprint, along with supporting circuitry.

Figure 2:
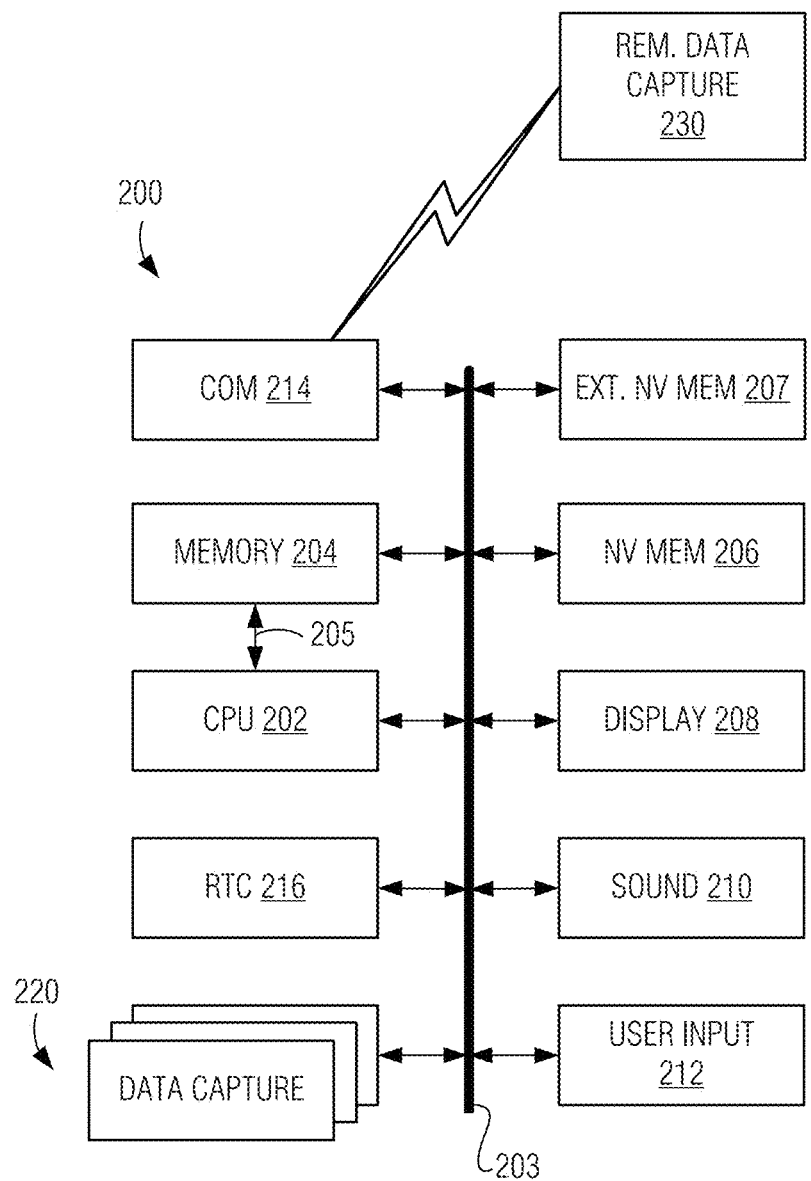
FIG. 2 is a block diagram illustrating an exemplary system architecture of a computing device such as the device of FIG. 1, according to an embodiment.

FIG. 2 is a block diagram illustrating an exemplary system architecture 200 of computing device 100 according to an embodiment. Central processor unit (CPU) 202 includes one or more microprocessors on which the overall functionality of computing device 100 is executed. CPU 202 is formed from hardware that is electrically interfaced with system link 203, which carries data and control signaling between the various components. As illustrated, system link 203 is similarly interfaced with each of the other components of system architecture 200. Memory 204 includes working memory space, and is constructed from suitable high-speed memory devices such as synchronous dynamic random access memory (SDRAM). In the embodiment illustrated, CPU 202 may access memory 204 using high-speed interface 205. Non-volatile memory 206 is constructed using read-only memory (ROM), electrically-erasable programmable read-only memory (EEPROM), flash memory or other suitable non-volatile storage technology. Non-volatile memory 206 stores system and application software that is executed by CPU 202 and, in some cases, by processors present in one or more other components.

External non-volatile memory 207 includes an interface such as a secure digital (SD) card slot, which may accept removable storage media to be used as additional non-volatile data storage.

Display 208 includes display 104 and circuitry for interfacing the display 104 with the system, as well as video driving circuitry. Sound 210 contains circuitry for driving the audio output to a speaker or headphones, and the circuitry for interfacing with the system. User input 212 contains the circuitry for interfacing with input devices such as input device 106. Communications block 214 represents communications circuitry and circuitry for interfacing the communications circuitry with the system. Communications block 214 may include a radio for communicating over a cellular network such as a network designed according to the Long-Term Evolution (LTE), LTE-Advanced, 5G or Global System for Mobile Communications (GSM) families of standards. Also, communications circuitry 214 may include a Wi-Fi communications radio according to the IEEE 801.11 family of standards, or a Bluetooth radio circuit according to the IEEE 802.15 family of standards. Real-time clock 216 includes circuitry that provides a clock that maintains the current date and time, and that interfaces the clock to the system.

Data capture devices 220 are integrated with computing device 200. According to various embodiments, data capture devices 220 include a plurality of different types of sensing transducers and their associated processing and interface circuitry, such as a camera, GPS, accelerometer, and biometric sensor.

In the case of a camera, the transducer may be an image sensor device, such as a charge-coupled device (CCD) array or a complementary metal-oxide semiconductor (CMOS)-based sensor. In the case of a GPS, the transducer is one or more GPS signal-receiving antennas. In the case of an accelerometer, the transducer may be a micro electro-mechanical system (MEMS)-based device utilizing capacitive, piezoelectric, or other suitable technology to produce electrical signaling. In the case of a biometric sensor, the transducer may be any suitable optical, capacitive, ultrasonic, chemical, or other sensor. It will be understood that these examples are provided herein for illustration and context, and are not meant to be limiting unless expressly enumerated in a particular claim.

The processing circuitry associated with each corresponding transducer may include amplification, buffering, filtering, or other signal-conditioning circuitry to receive the raw analog signal from the corresponding transducer and prepare the analog signaling for digitization, analog-to-digital conversion circuitry to perform sampling, quantization, and digital encoding, and, in some cases, further processing to produce a digital signal representing the physical phenomenon being measured by the transducer in a form that is readable by CPU 202.

Remote data capture device 230 is interfaced with CPU 202 via communication block 214, as depicted. Remote data capture device 230 may be any type of data capture device described above, or may be a different type of data capture device altogether.

Figure 3:
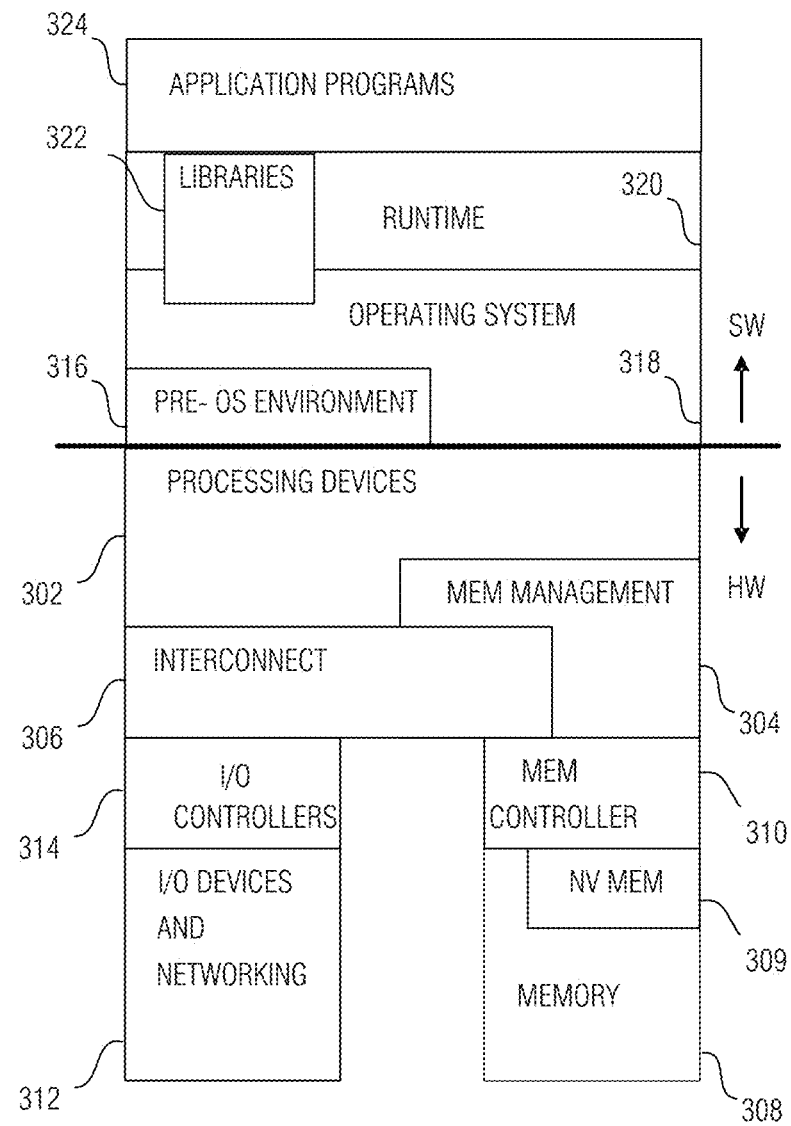
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a general-purpose computing device on which various aspects of the embodiments may be realized. The general-purpose computing device may be transformed into a special-purpose machine by instructions that, when executed, cause the general-purpose computing device to carry out operations in accordance with one or more embodiments of the invention. In FIG. 3, various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (i.e., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, described in greater detail below, is responsible for initiating the launching of the operating system, but also provides an execution environment for embedded applications according to certain aspects of the invention. Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Examples, as described herein, may include, or may operate on, logic or a number of components, engines, or modules, which for the sake of consistency are termed modules, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. With reference to FIG. 3, for instance, a module may include one, or any combination, of the blocks depicted, so long as at least one block from the HW side is included.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

A computing platform according to embodiments of the invention is a special-purpose machine that may be configured based on a general-purpose computing device, such as a personal computer (PC) having an architecture such as the one described in the example of FIG. 3. The computing platform may be one physical machine, or may be distributed among multiple physical machines, such as by role or function, or by process thread in the case of a cloud computing distributed model. In various embodiments, aspects of the embodiments may be configured to run in virtual machines that in turn are executed on one or more physical machines. It will be understood by persons of skill in the art that features of the invention may be realized by a variety of different suitable machine implementations.

Figure 4:
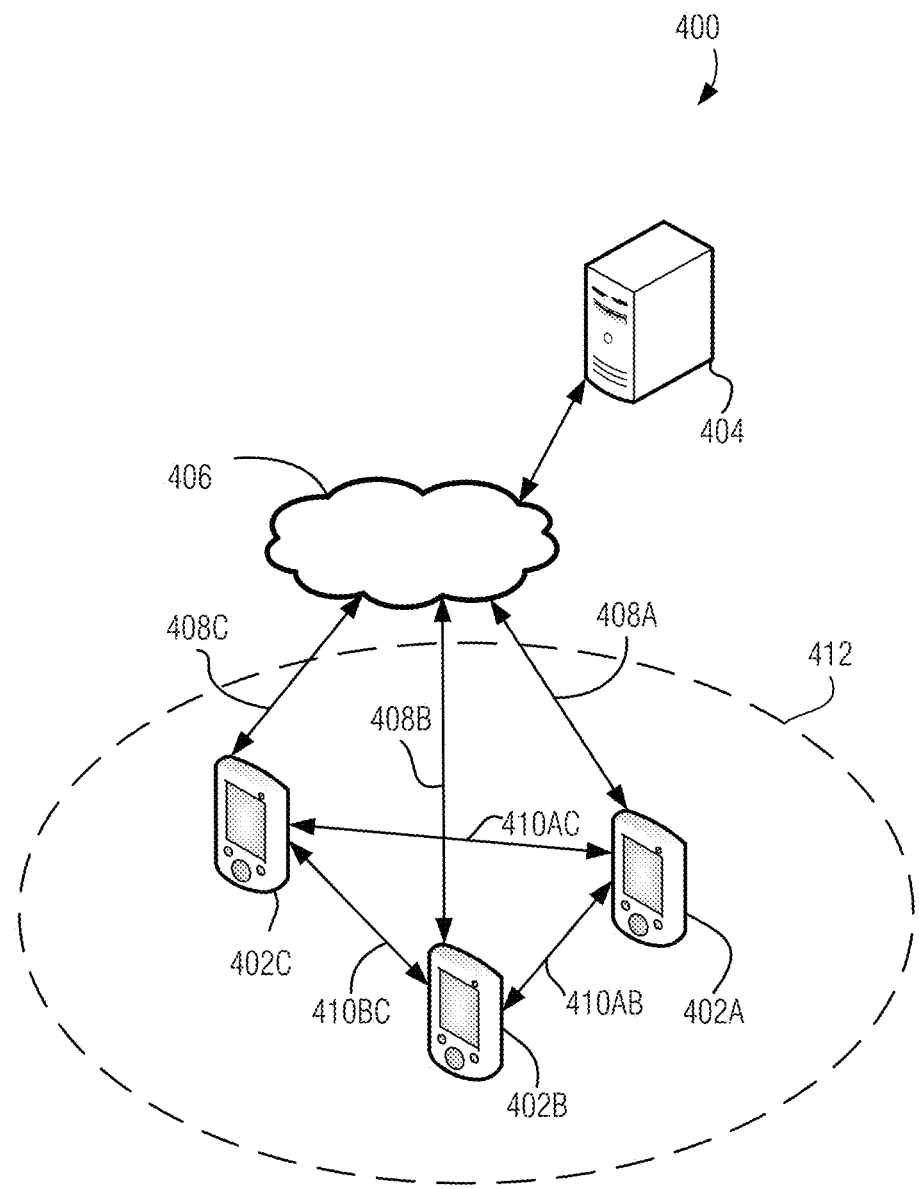
FIG. 4 is a high-level system diagram illustrating an ad-hoc community of mobile computing devices, and a community context service.

FIG. 4 is a high-level system diagram illustrating an ad-hoc community of mobile computing devices, and a community context service. System 400 includes mobile computing devices 402A, 402B, and 402C (which may generally be referenced herein as devices 402). In this example, each device 402 includes a mobile computing platform according to one or more of the examples discussed above with reference to FIGS. 1-3.

In an embodiment, each mobile computing device 402 may perform local context determination. In a related embodiment, some devices 402 are not able to perform local context determination, or have limited capabilities for performing local context determination. For instance, a particular device 402 may have relatively few sensors compared with other devices, and consequently, that device has a limited ability to detect certain user activities (e.g., a device that has a location-determining sensor but lacks an accelerometer may not be able to discern the difference between motion due to running or motion due to riding a bicycle or other vehicle if the speed measured by location change is within the range of running speeds.

As another example, even a full-featured device 402 having location, motion, and orientation sensing capability, may have difficulty discerning between the context of riding a bicycle or riding in a motor vehicle in a dense urban environment with frequent stops and heavy traffic preventing motor vehicles from achieving high speeds.

According to an embodiment, devices 402 generate a confidence score along with any locally-generated context determinations. A confidence score in this type of embodiment is a measure of certainty of a context determination. In general, a confidence score is provided by operation of the context determination algorithm within each device 402. In an example, the confidence score may be based on a measure of similarity between measured sensor states and a defined context template represented in terms of a set of reference sensor states. Any suitable algorithm(s) for determining context states and confidence scores may be utilized according to embodiments.

In other embodiments, some devices 402 do not perform local context determination, instead relying on remotely-processed context determination performed by a distinct computing entity that is communicated to those devices 402. The distinct computing entity may be a peer device 402, or a remote service, for example.

Some aspects of the embodiments are based on the recognition that there is a likelihood, generally speaking, that multiple devices 402 within close proximity of one another have a common context. Moreover, multiple devices 402 that are in close proximity may have diverse hardware platforms, different types of sensors, and access to different information from which the context may be determined. Accordingly, some embodiments are directed to taking advantage of these realizations to advantageously make use of the collective context awareness of similarly-situated devices 402. Similarly-situated devices are within a deterministic proximity of one another. In related embodiments, similarly-situated devices are also reporting similar context information.

Returning briefly to the example of discerning bicycle-riding versus bus-riding activities, device 402A that has a similar location as device 402B, may have access to a user heart-rate monitor (such as via a wearable sensor, or via a sensor incorporated as part of a secondary mobile computing device such as a smart watch). In this case, device 402A may generate a context determination with high confidence (e.g., if the measured heart rate is elevated to an aerobic-output range). Device 402C may have a different source of information from which context may be determined with high confidence. For instance, a context determination module of device 402C may have access to the user's calendar or email, which may indicate a planned activity of bicycling at the present time. This information, combined with measured motion, may be strongly indicative of a bicycling context.

Accordingly, in one type of embodiment, mobile computing device 402B may utilize the context determination of devices 402A or 402C (or both) to supplement (or replace) its own context determination. In a related embodiment, device 402B may simply use the context determination of devices 402A or 402C. This embodiment may be used when device 402B lacks a local context determination capability.

In one type of embodiment, an ad-hoc community context service 404 is provided. Ad-hoc community context service 404 may be implemented on a computing platform such as the examples described above with reference to FIG. 3.

Ad-hoc community context service 404 may be communicatively coupled to each device 402 via a communication network 406 such as the Internet, though it will be understood that in various implementations, other wide-area networks (WANs), local-area networks (LANs), personal-area networks (PANs), cellular data networks, etc., may be utilized to facilitate communication between devices 402 and ad-hoc community context service 404. Each device 402 may utilize a particular connection to communication network 406, which may differ from the connection used by other devices 402. For example, connection 408A of mobile computing device 402A may differ from connections 408B and 408C corresponding to mobile computing devices 402B and 402C, respectively. For instance, connection 408A may be a wireless LAN connection, whereas connection 408B may be a connection via a mobile data network such as a long-term evolution (LTE)-type network.

In an embodiment, ad-hoc community context service 404 collects relevant information from devices 402 and classifies the devices 402 into communities. In the example depicted in FIG. 4, mobile computing devices 402A, 402B, and 402C are located in area 412, which defines a proximity in which a community of devices 402 may be recognized. The communities are ad-hoc in nature because community membership may change dynamically as devices 402 move about or engage in different activities. When a requesting device 402 submits a query for community context information, ad-hoc community context service 404 identifies the community of devices that are similarly situated to the requesting device 402, and provides community-context information based on the reported context of those similarly-situated devices. In a related embodiment, the requesting device In another embodiment, devices 402 exchange context information in a peer-peer fashion. For instance, peer-peer communication link 410 AB may be established between devices 402A and 402B. Similarly, peer-peer communication links 410AC and 410BC may be established between pairs of devices 402A and 402C, and 402B and 402C, respectively. In this type of embodiment, each device 402 may implement at least a portion of the functionality of ad-hoc community context service 404.

In a related type of embodiment, the peer-peer interconnect may be implemented as a wireless mesh network, where multi-hop communications and suitable message routing are facilitated. In a related embodiment, devices 402 are Internet-of-Things (IoT) devices, and a mesh network of IoT devices, termed a fog, may operate at the edge of a cloud network, such as network 406. The fog may be a massively-interconnected network wherein a number of IoT devices are in communications with each other, for example, by radio links. This may be performed using the open interconnect consortium (OIC) standard specification 1.0 released by the Open Connectivity Foundation™ (OCF) on Dec. 23, 2015. Devices consistent with this standard are able to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Various types of IoT devices are contemplated, including gateways, data aggregators, and sensors, for instance. The gateways may be edge devices that provide communications between the cloud and the fog, and may also provide the backend process function for data obtained from sensors, such as motion data, flow data, temperature data, and the like. The data aggregators may collect data from any number of the sensors, and perform the back-end processing function for the analysis. The results, raw data, or both, may be passed along to the cloud through the gateways. The sensors may be full IoT devices, for example, capable of both collecting data and processing the data. In some cases, the sensors may be more limited in functionality, for example, collecting the data and allowing the data aggregators or gateways to process the data.

Communications from any IoT device may be passed along the most convenient path between any of the IoT devices to reach the gateways. In these networks, the number of interconnections provide substantial redundancy, allowing communications to be maintained, even with the loss of a number of IoT devices. Further, the use of a mesh network may allow IoT devices that are very low power or located at a distance from infrastructure to be used, as the range to connect to another IoT device may be much less than the range to connect to the gateways.

The fog of these IoT devices may be presented to devices in the cloud, such as a server, as a single device located at the edge of the cloud, e.g., a fog device. In this example, the alerts coming from the fog device may be sent without being identified as coming from a specific IoT device within the fog.

In some examples, the IoT devices may be configured using an imperative programming style, e.g., with each IoT device having a specific function and communication partners. However, the IoT devices forming the fog may be configured in a declarative programming style, allowing the IoT devices to reconfigure their operations and communications, such as to determine needed resources in response to conditions, queries, and device failures. As an example, a query from a user located at a server about the operations of a subset of IoT devices may result in the fog selecting the IoT devices, such as particular sensors, needed to answer the query. The data from these sensors may then be aggregated and analyzed by any combination of the sensors, data aggregators, or gateways, before being sent on by the fog device to the server to answer the query. In this example, IoT devices in the fog may select the sensors used based on the query, such as adding data from certain sensors but not others. Further, if some of the IoT devices are not operational, other IoT devices in the fog may provide analogous data, if available.

Figure 5:
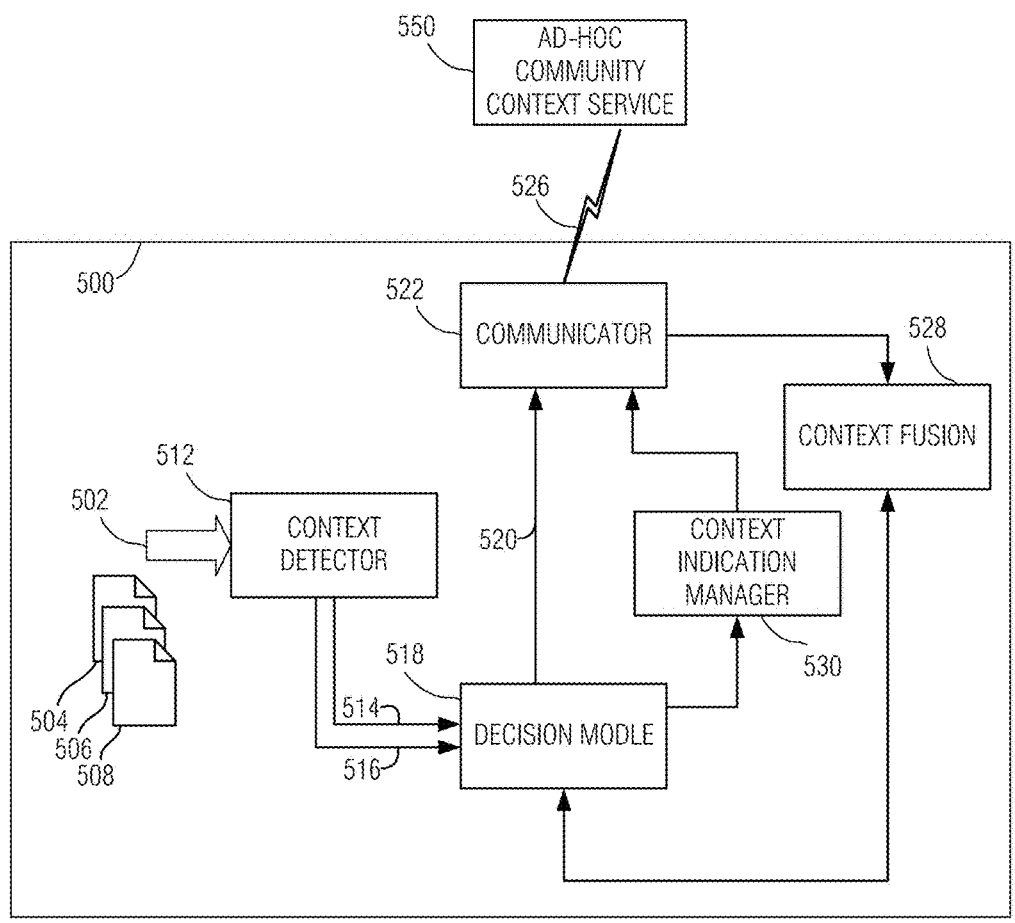
FIG. 5 is a block diagram illustrating modules for implementing a context determination system that utilizes a community context service according to an embodiment.

FIG. 5 is a block diagram illustrating modules for implementing a context determination system that utilizes a community context service according to an embodiment. System 500 may be implemented on a mobile computing device 402 according to an embodiment. Ad-hoc community service 550 may be implemented on a remote server or distributed computing system virtualized as a server, for example.

System 500 includes an input module 502 that gathers information for use in determining context. In the example depicted, input information includes sensor data 504, which may be one or more of the following types:

User-input sensors (e.g., touchscreen actions, keypresses, mouse movements, etc.).
Ambient-environment sensors (e.g., photo/video image capture, sound capture, etc.).
Device-disposition sensors (e.g., GPS location, device orientation (e.g., magnetometer readings), accelerometer readings, gyrometer readings, pressure readings, etc.).
User-physiology sensors (e.g., biometric data, heart rate, blood pressure, pulse oximetry, EKG waveform parameters).

The input information may also include externally-provided information 506, such as network-based location, information from networked devices such as remote sensors, secondary devices such as smartwatches, Internet-of-things (IoT) devices, etc. In addition, the input information may include application-based information 508, such as calendar entries, email, messaging, active processes (e.g., phone in use, game in use, camera in use, etc.), and the like.

Context detector module 512 is programmed, or otherwise configured, to implement a set of decision criteria and algorithms to locally determine context from the input information to produce a context determination 514, and a confidence score 516. Decision module 518 assesses the determined context and confidence score against decision criteria to ascertain whether or not the locally-determined context is reliable for use by other processes of the mobile computing device. In one example, a threshold test is applied to check if the confidence score is sufficiently high to deem the locally-determined context as reliable. In a related embodiment, different thresholds may be used depending on the prevailing locally-determined context. For instance, certain contexts may be more distinct from other contexts, or may be more easily observable, requiring fewer sensors, or determinable by the independent use of different sensors. In this case, a lower threshold may be applied by decision module 518.

If decision module 518 assesses the locally-determined context to be insufficiently reliable on its own, it may send a request 520 to ad-hoc community context service 550 to provide community context information. To this end, communicator module 522 transmits the request via remote communication link 526 to ad-hoc community context service 550. Communicator module 522 also receives community-context information from ad-hoc community context service 550 in response to the request.

Context fusion module 528 is passed the received community-context information, and combines it with the locally-generated context. The combination may be achieved in a variety of ways according to related embodiments. For example, context fusion module 528 may select the context with the highest confidence score. In another embodiment, context fusion module 528 may incorporate the community-context information as part of a context state vector that represents multiple contexts at once (e.g., the user is traveling by train and is asleep). In a related embodiment, context fusion module 528 includes a set of criteria that define how context information from the various sources, local or community-based, is to be used.

Content indication manager 530 is passed context information by decision module 518, which may include determined context and associated confidence scoring, and maintains the current context for access by processes executing on the mobile computing device. In a related embodiment, context indication manager 530 obtains individual context determinations, and builds a context state vector as the context indication. The current context indication may be provided to communicator module 522 to be transmitted to ad-hoc community context service 550 in response to reporting criteria (e.g., a change in location or a change in determined context).

Figure 6:
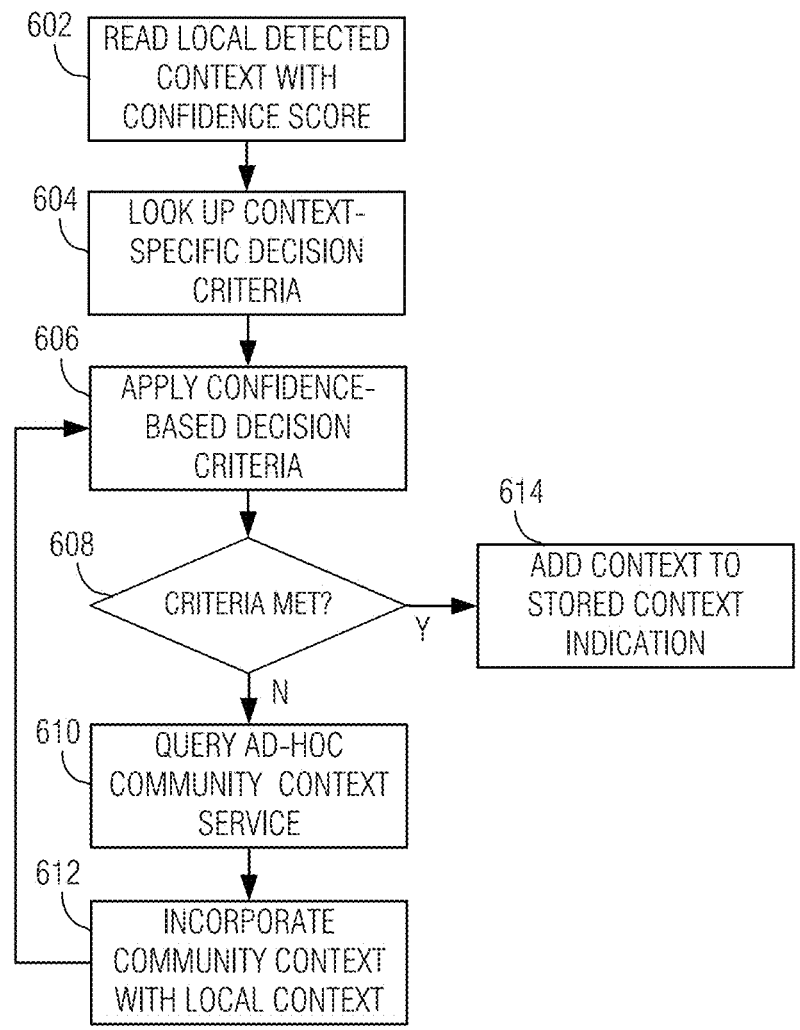
FIG. 6 is a flow diagram illustrating an example process as carried out by the system of FIG. 5 according to an embodiment.

FIG. 6 is a flow diagram illustrating an example process as carried out by system 500 of a mobile computing device according to an embodiment. Operation 602 reads local detected context along with the associated confidence score. At 604, context-specific decision criteria is looked up from a database or other data structure used to store the criteria. At 606, confidence-based decision criteria, which may be context-specific, is applied to assess the reliability of the local context determination. The decision criteria may be a minimum confidence score threshold to be met, for example. At decision 608, if the criteria is not met, the ad-hoc community context service is queried. At 612, the community context information obtained as a result of the query is incorporated with the local context, and the process loops back to operation 606 to apply the criteria. If decision 608 determines that the criteria is met, the process advances to 614, where the context is added to the stored context indication.

Figure 7:
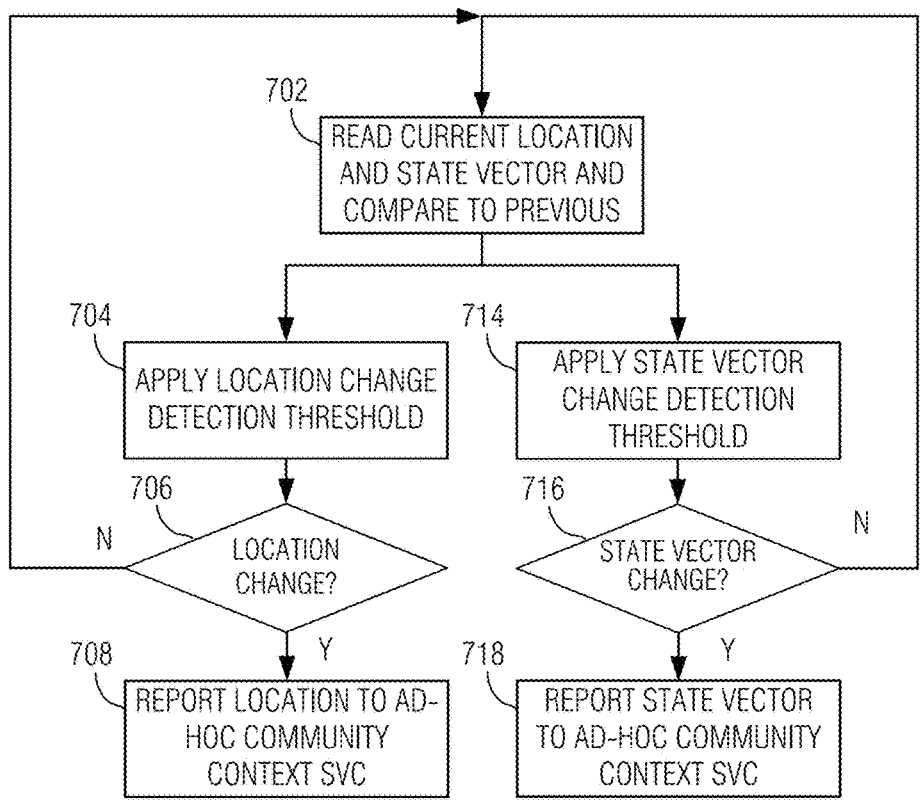
FIG. 7 is a flow diagram illustrating a decision process that may be carried out by a mobile computing device for reporting its context or location to the ad-hoc community context service according to an embodiment.

FIG. 7 is a flow diagram illustrating a decision process that may be carried out by a mobile computing device for reporting its context or location to the ad-hoc community context service according to an embodiment. At 702, the mobile device reads its current location and context state vector, and compares each to its previous value. In this example, the context is stored in a state-vector form in which multiple contexts may be represented in a data structure. The process then splits into two asynchronous paths. The first path relates to changes in location. At 704, a location change threshold is applied to the location comparison result. At 706 a decision is made as to whether the amount of location variation is sufficient to merit reporting the device's new location to the ad-hoc community context service. In the affirmative case, the location is reported at 708. Otherwise, the process loops back to operation 702.

The second path relates to changes in indicated context. At 714, the context state vector comparison result is compared against the corresponding threshold to assess the degree of change. A threshold relating to the state vector may specify a minimum confidence score that must be met by a changed context indication for the reporting to be performed, for example. At decision 716, the process determines if the context state vector change is of a sufficient extent to merit reporting the new context state vector to the ad-hoc community context service. In the affirmative case, the reporting is performed at 718. Otherwise, the process loops back to 702. In a related embodiment, operations 708 and 718 may be performed together any time one of decisions 706 or 716 produces an affirmative-case indication. In other words, a call to report either the location change or context change would result in reporting both updated items.

Figure 8:
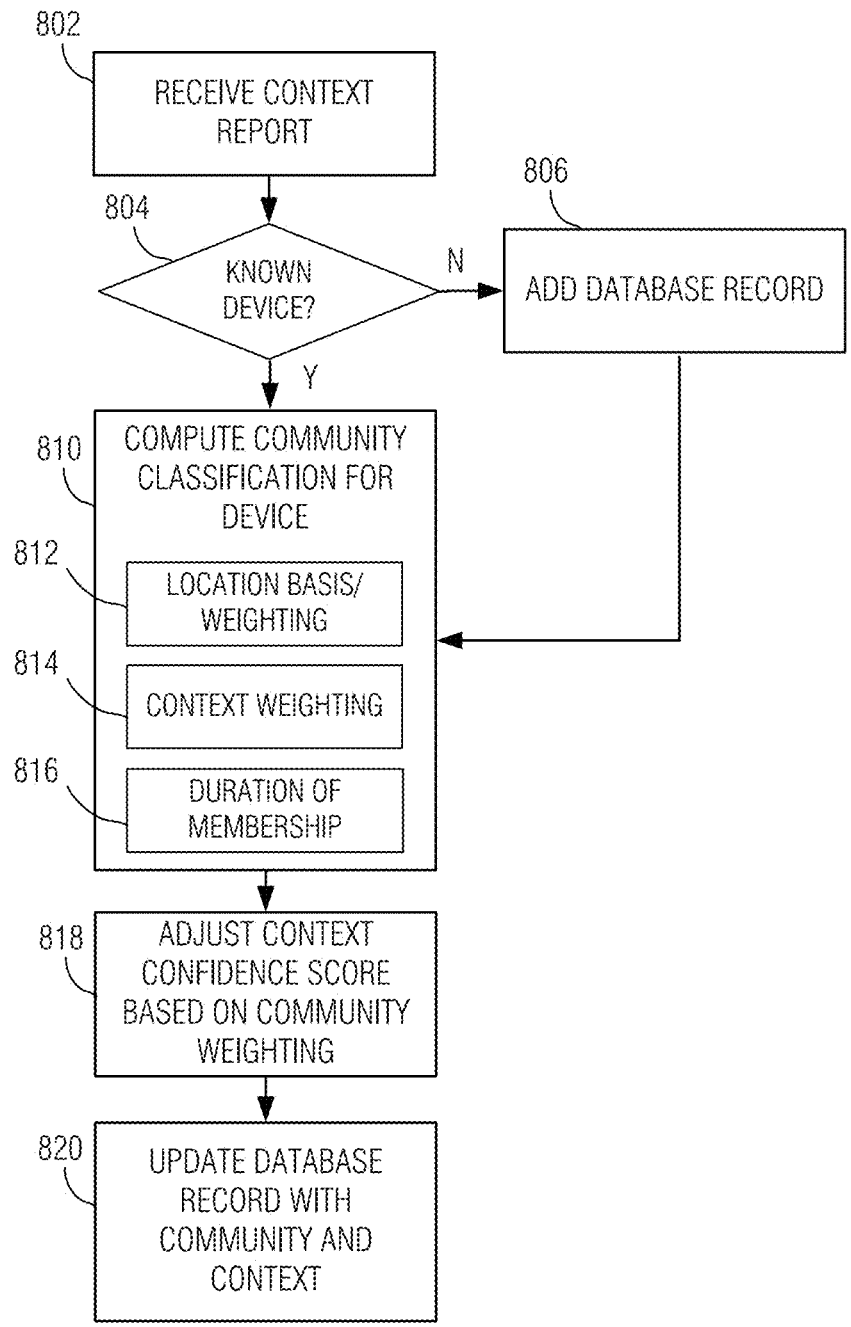
FIG. 8 is a flow diagram illustrating an example process carried out by an ad-hoc community context service to establish ad-hoc communities of mobile computing devices in response to context reports from those devices according to an embodiment.

FIG. 8 is a flow diagram illustrating an example process carried out by an ad-hoc community context service to establish ad-hoc communities of mobile computing devices in response to context reports from those devices according to an embodiment. At 802, a context report is received from a mobile computing device. At decision 804, the process determines if the device is known (i.e., having previously reported) or unknown, to the service. If the device is unknown, a database record for that device is created at 806.

At 810, the reporting device is classified into an ad-hoc community based on community membership criteria. Various classification techniques are contemplated within the scope of the embodiments, such as k-nearest-neighbor classification, clustering, support vector machine, neural network-based techniques, learning vector quantization, linear or quadratic classification, or the like.

In the embodiment depicted, the classification includes a primary basis of device location for classification into the community, as indicated at 812. Relevant community membership criteria may include a spatial distribution limit, such as 10 meters, for example, within which community member devices are to be located in order to qualify for membership in the community.

In a related embodiment, the spatial distribution limit may be variable based on the prevailing context among potential members within a certain vicinity. For example, the spatial distribution limit may be adjusted to 30 meters when the prevailing context among potential members is associated with robust activity such as running, bicycling, etc. Conversely, the spatial distribution limit may be adjusted down to 15 meters for more sedentary context trends being reported, such as standing or sitting still. As another illustrative example, reported contexts among devices in a given vicinity indicative of vehicular transportation may trigger adjustment of the spatial distribution limit down to 3 meters.

In a related embodiment, a weighting function may be added based on the geographic distance of the device to a reference point, such as an average current position of all devices in the classified community. The weighting function may be applied to the confidence score to amplify or attenuate the reporting device's context determination relative to other reporting devices.

At 814, a context weighting may be independently applied based on similarity of the device's reported context to the most common or highest-average-confidence context reported by other devices in the community. At 816 a duration-of-membership weighting may be applied, where the confidence score is increased or decreased based on the time duration that the reporting device has been classified in its present community. This type of weighting amplifies the context determination for devices in the possession of users that appear to be traveling, or conducting some activity, together, as opposed to passers-by.

The process advances to 818, where the various weighting results are applied to the confidence score for the reporting device. At 820, the resulting community classification, context information (including confidence score) are saved in the database record corresponding to the reporting device. This process is repeated in response to each context or location update report by the different mobile computing devices.

Figure 9:
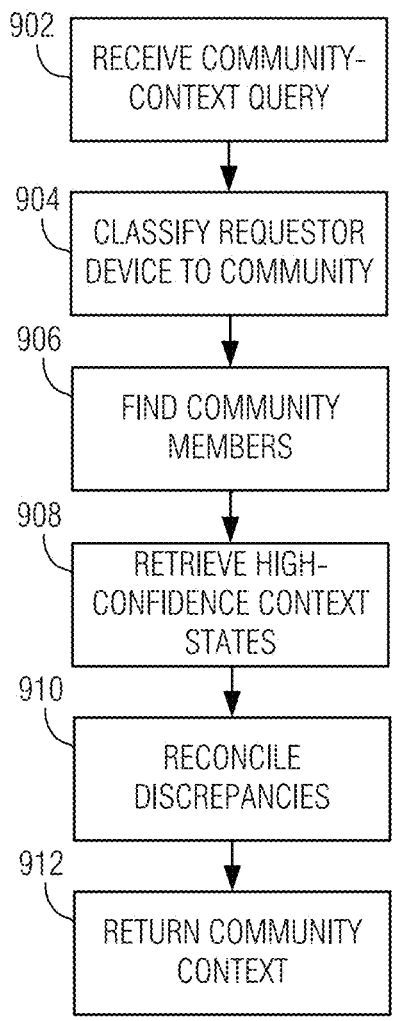
FIG. 9 is a flow diagram illustrating a process that may be carried out by an ad-hoc community context service in response to a community-context query according to an embodiment.

FIG. 9 is a flow diagram illustrating a process that may be carried out by an ad-hoc community context service in response to a community-context query according to an embodiment. At 902, the query is received from a requestor. The requestor is a mobile computing device that may or may not have reported its location and context information to the service. In response, at 904, the requestor is classified into a community. It is possible, due to the requestor's location or other factors, that the requestor is the sole member of its community. In this case, the process returns a null set, in which case the ad-hoc community context service is of little or no use to the requestor at the present time.

In a useful case, at 906, the service finds members of the classified community of the requestor. This operation returns a set of devices that are reported to be within some determinative proximity to the requestor. Next, at 908, the result set is filtered to retrieve the context indicators that are associated with high confidence scores. In an example, a thresholding function is applied that selects context indicators for confidence scores that are higher than a defined threshold. In another example, the N-highest confidence scores are selected, and only the associated context indicators are returned, where N is some specified value less than or equal to the number of devices in the community.

The operations performed up to this point may return conflicting context indicators. At 910, any discrepancies are reconciled by the ad-hoc community context service. Reconciliation may involve selecting the context information that is associated with the highest confidence score, for example In another example, other factors may be considered, such as weighting functions that consider parameters such as reported context stability over time, reporting frequency, type of device, type(s) of sensors used, similarity to other determined contexts of community members, etc. At 912, the selected set of context representative of the community is returned to the requestor.

FIGS. 6-9 are flow diagrams illustrating example processing operations according to various embodiments. It is important to note that the example processes are richly-featured embodiments that may be realized as described; in addition, portions of the processes may be implemented while others are excluded in various embodiments. The following Additional Notes and Examples section details various combinations, without limitation, that are contemplated. It should also be noted that in various embodiments, certain process operations may be performed in a different ordering than depicted, provided that the logical flow and integrity of the process is not disrupted in substance.

Additional Notes & Examples:

Example 1 is a system for determining context in a first mobile computing device, the system comprising hardware including a processor and a data store containing instructions that, when executed, cause the computing hardware to implement: a context indication manager module to store current context representing a current user activity or environment in which the first mobile device is used; a decision module to generate a query for transmission to a remote community context service; and a communicator module to obtain community context information from the remote community context service, the community context information being based on a remote context determination of a second mobile computing device determined to be similarly situated to the first computing device according to community membership criteria; wherein the context indication manager module is to update the indication of the current context based on the community context information.

In Example 2, the subject matter of Example 1 optionally includes wherein the decision module is to generate the query in response to a determined need to obtain community context information.

In Example 3, the subject matter of any one or more of Examples 1-2 optionally include a context detector module to determine the current context based on a plurality of inputs from data capture devices and based on context criteria, the context detector to further assess a confidence score for the current context.

In Example 4, the subject matter of Example 3 optionally includes wherein the decision module is to apply confidence-based decision criteria to the confidence score in order to determine the need to obtain the community context information.

In Example 5, the subject matter of any one or more of Examples 3-4 optionally include a context fusion module to combine the community context information with the determined current context to produce an updated current context indication.

In Example 6, the subject matter of any one or more of Examples 3-5 optionally include wherein the data capture devices are sensors of the first mobile computing device, and further comprising: an input module to obtain sensor data from the plurality of sensors and pass the sensor data to the context detector module.

In Example 7, the subject matter of any one or more of Examples 1-6 optionally include wherein the second mobile computing device similarly-situated to the first computing device is part of a community comprising a plurality of mobile computing devices within a defined spatial proximity of one another.

In Example 8, the subject matter of any one or more of Examples 1-7 optionally include wherein the second mobile computing device similarly-situated to the first computing device is part of a community comprising a plurality of mobile computing devices within a defined spatial proximity of one another and having similar reported context according to applied context similarity criteria.

In Example 9, the subject matter of any one or more of Examples 1-8 optionally include wherein the community context information includes context information derived from a plurality of individual context determinations by a plurality of similarly-situated mobile computing devices.

In Example 10, the subject matter of any one or more of Examples 1-9 optionally include wherein the community context information includes context information selected from among plurality of individual context determinations by the plurality of similarly-situated mobile computing devices based on respective confidence level determinations of the individual context determinations.

In Example 11, the subject matter of any one or more of Examples 1-10 optionally include wherein the community context information includes confidence scoring of the remote context determination.

In Example 12, the subject matter of any one or more of Examples 1-11 optionally include wherein the context indication manager module is to further report the indication of the current context to the remote community context service in response to a change of location of the first mobile computing device.

In Example 13, the subject matter of any one or more of Examples 1-12 optionally include wherein the context indication manager module is to further report the indication of the current context to the remote community context service in response to a change in the current indication of the current context of the first mobile computing device.

In Example 14, the subject matter of any one or more of Examples 1-13 optionally include wherein the indication of the current context is stored as a state vector.

Example 15 is a server for providing community context service for mobile computing devices, the server comprising computing hardware including a processor and a data store containing instructions that, when executed, cause the computing hardware to: store reported context received from a plurality of remote mobile computing devices; classify the remote mobile computing devices into a plurality of ad-hoc communities based on reported current locations of the remote mobile computing devices; receive a community-context request from a first mobile computing device; classify the first mobile computing device into a first ad-hoc community of the plurality of ad-hoc communities based on a location of the first mobile computing device; retrieve a portion of the reported context that corresponds to a second mobile computing device classified in the first ad-hoc community; and send community-context information to the first mobile device, the community-context information being based on the portion of the reported context.

In Example 16, the subject matter of Example 15 optionally includes wherein the reported context from each of the plurality of remote mobile computing devices represents a current user activity or environment in which that mobile device is used.

In Example 17, the subject matter of any one or more of Examples 15-16 optionally include wherein the reported context from each of the plurality of remote mobile computing devices includes a confidence score.

In Example 18, the subject matter of Example 17 optionally includes wherein the instructions, when executed, further cause the computing hardware to classify the remote mobile computing devices into the plurality of ad-hoc communities based further on the confidence score of the reported context from each of the plurality of remote mobile computing devices.

In Example 19, the subject matter of any one or more of Examples 17-18 optionally include wherein the instructions, when executed, further cause the computing hardware to adjust the confidence score of the reported context from each of the remote mobile computing devices based on a duration that the remote mobile computing device has been classified in its current ad-hoc community.

Example 20 is a method for determining context for a first mobile computing device, the method comprising: storing, by the first mobile computing device, current context representing a current user activity or environment in which the first mobile device is used; generating, by the first mobile computing device, a query for transmission to a remote community context service; obtaining, by the first mobile computing device, community context information from the remote community context service, the community context information being based on a remote context determination of a second mobile computing device determined to be similarly situated to the first computing device according to community membership criteria; and updating, by the first mobile computing device, the indication of the current context based on the community context information.

In Example 21, the subject matter of Example 20 optionally includes wherein the query is generated in response to a determined need to obtain community context information.

In Example 22, the subject matter of any one or more of Examples 20-21 optionally include determining, by the first mobile computing device, the current context based on a plurality of inputs from data capture devices and based on context criteria, and on an assessment of a confidence score for the current context.

In Example 23, the subject matter of Example 22 optionally includes applying, by the first mobile computing device, confidence-based decision criteria to the confidence score in order to determine the need to obtain the community context information.

In Example 24, the subject matter of any one or more of Examples 22-23 optionally include combining, by the first mobile computing device, the community context information with the determined current context to produce an updated current context indication.

In Example 25, the subject matter of any one or more of Examples 20-24 optionally include wherein the second mobile computing device similarly-situated to the first computing device is part of a community comprising a plurality of mobile computing devices within a defined spatial proximity of one another.

In Example 26, the subject matter of any one or more of Examples 20-25 optionally include wherein the second mobile computing device similarly-situated to the first computing device is part of a community comprising a plurality of mobile computing devices within a defined spatial proximity of one another and having similar reported context according to applied context similarity criteria.

In Example 27, the subject matter of any one or more of Examples 20-26 optionally include wherein the community context information includes context information derived from a plurality of individual context determinations by a plurality of similarly-situated mobile computing devices.

In Example 28, the subject matter of any one or more of Examples 20-27 optionally include wherein the community context information includes context information selected from among plurality of individual context determinations by the plurality of similarly-situated mobile computing devices based on respective confidence level determinations of the individual context determinations.

In Example 29, the subject matter of any one or more of Examples 20-28 optionally include wherein the community context information includes confidence scoring of the remote context determination.

In Example 30, the subject matter of any one or more of Examples 20-29 optionally include reporting, by the first mobile computing device, the indication of the current context to the remote community context service in response to a change of location of the first mobile computing device.

In Example 31, the subject matter of any one or more of Examples 20-30 optionally include reporting, by the first mobile computing device, indication of the current context to the remote community context service in response to a change in the current indication of the current context of the first mobile computing device.

In Example 32, the subject matter of any one or more of Examples 20-31 optionally include wherein the indication of the current context is stored as a state vector.

Example 33 is a method for providing community context service for mobile computing devices, the method being performed by a service implemented on computing hardware, and comprising: storing reported context received from a plurality of remote mobile computing devices; classifying, by the server, the remote mobile computing devices into a plurality of ad-hoc communities based on reported current locations of the remote mobile computing devices; receiving a community-context request from a first mobile computing device; classifying the first mobile computing device into a first ad-hoc community of the plurality of ad-hoc communities based on a location of the first mobile computing device; retrieving a portion of the reported context that corresponds to a second mobile computing device classified in the first ad-hoc community; and sending community-context information to the first mobile device, the community-context information being based on the portion of the reported context.

In Example 34, the subject matter of Example 33 optionally includes wherein the reported context from each of the plurality of remote mobile computing devices represents a current user activity or environment in which that mobile device is used.

In Example 35, the subject matter of any one or more of Examples 33-34 optionally include wherein the reported context from each of the plurality of remote mobile computing devices includes a confidence score.

In Example 36, the subject matter of Example 35 optionally includes classifying the remote mobile computing devices into the plurality of ad-hoc communities based further on the confidence score of the reported context from each of the plurality of remote mobile computing devices.

In Example 37, the subject matter of any one or more of Examples 35-36 optionally include adjusting the confidence score of the reported context from each of the remote mobile computing devices based on a duration that the remote mobile computing device has been classified in its current ad-hoc community.

Example 38 is at least one computer-readable storage medium containing instructions that, when executed on computing hardware of a first mobile device, cause the first mobile computing device to perform operations comprising: storing current context representing a current user activity or environment in which the first mobile device is used; generating a query for transmission to a remote community context service; obtaining community context information from the remote community context service, the community context information being based on a remote context determination of a second mobile computing device determined to be similarly situated to the first computing device according to community membership criteria; and updating the indication of the current context based on the community context information.

In Example 39, the subject matter of Example 38 optionally includes wherein the query is generated in response to a determined need to obtain community context information.

In Example 40, the subject matter of any one or more of Examples 38-39 optionally include instructions for determining the current context based on a plurality of inputs from data capture devices and based on context criteria, and on an assessment of a confidence score for the current context.

In Example 41, the subject matter of Example 40 optionally includes instructions for applying confidence-based decision criteria to the confidence score in order to determine the need to obtain the community context information.

In Example 42, the subject matter of any one or more of Examples 40-41 optionally include instructions for combining the community context information with the determined current context to produce an updated current context indication.

In Example 43, the subject matter of any one or more of Examples 38-42 optionally include wherein the second mobile computing device similarly-situated to the first computing device is part of a community comprising a plurality of mobile computing devices within a defined spatial proximity of one another.

In Example 44, the subject matter of any one or more of Examples 38-43 optionally include wherein the second mobile computing device similarly-situated to the first computing device is part of a community comprising a plurality of mobile computing devices within a defined spatial proximity of one another and having similar reported context according to applied context similarity criteria.

In Example 45, the subject matter of any one or more of Examples 38-44 optionally include wherein the community context information includes context information derived from a plurality of individual context determinations by a plurality of similarly-situated mobile computing devices.

In Example 46, the subject matter of any one or more of Examples 38-45 optionally include wherein the community context information includes context information selected from among plurality of individual context determinations by the plurality of similarly-situated mobile computing devices based on respective confidence level determinations of the individual context determinations.

In Example 47, the subject matter of any one or more of Examples 38-46 optionally include wherein the community context information includes confidence scoring of the remote context determination.

In Example 48, the subject matter of any one or more of Examples 38-47 optionally include instructions for reporting the indication of the current context to the remote community context service in response to a change of location of the first mobile computing device.

In Example 49, the subject matter of any one or more of Examples 38-48 optionally include instructions for reporting indication of the current context to the remote community context service in response to a change in the current indication of the current context of the first mobile computing device.

In Example 50, the subject matter of any one or more of Examples 38-49 optionally include wherein the indication of the current context is stored as a state vector.

Example 51 is at least one computer-readable storage medium containing instructions that, when executed on computing hardware of a server, cause the server to perform operations comprising: storing reported context received from a plurality of remote mobile computing devices; classifying the remote mobile computing devices into a plurality of ad-hoc communities based on reported current locations of the remote mobile computing devices; receiving a community-context request from a first mobile computing device; classifying the first mobile computing device into a first ad-hoc community of the plurality of ad-hoc communities based on a location of the first mobile computing device; retrieving a portion of the reported context that corresponds to a second mobile computing device classified in the first ad-hoc community; and sending community-context information to the first mobile device, the community-context information being based on the portion of the reported context.

In Example 52, the subject matter of Example 51 optionally includes wherein the reported context from each of the plurality of remote mobile computing devices represents a current user activity or environment in which that mobile device is used.

In Example 53, the subject matter of any one or more of Examples 51-52 optionally include wherein the reported context from each of the plurality of remote mobile computing devices includes a confidence score.

In Example 54, the subject matter of Example 53 optionally includes instructions for classifying the remote mobile computing devices into the plurality of ad-hoc communities based further on the confidence score of the reported context from each of the plurality of remote mobile computing devices.

In Example 55, the subject matter of any one or more of Examples 53-54 optionally include instructions for adjusting the confidence score of the reported context from each of the remote mobile computing devices based on a duration that the remote mobile computing device has been classified in its current ad-hoc community.

Example 56 is an apparatus for determining context for a first mobile computing device, the apparatus comprising: means for storing current context representing a current user activity or environment in which the first mobile device is used; means for generating a query for transmission to a remote community context service; means for obtaining community context information from the remote community context service, the community context information being based on a remote context determination of a second mobile computing device determined to be similarly situated to the first computing device according to community membership criteria; and means for updating the indication of the current context based on the community context information.

In Example 57, the subject matter of Example 56 optionally includes wherein the query is generated in response to a determined need to obtain community context information.

In Example 58, the subject matter of any one or more of Examples 56-57 optionally include means for determining the current context based on a plurality of inputs from data capture devices and based on context criteria, and on an assessment of a confidence score for the current context.

In Example 59, the subject matter of Example 58 optionally includes means for applying confidence-based decision criteria to the confidence score in order to determine the need to obtain the community context information.

In Example 60, the subject matter of any one or more of Examples 58-59 optionally include means for combining the community context information with the determined current context to produce an updated current context indication.

In Example 61, the subject matter of any one or more of Examples 56-60 optionally include wherein the second mobile computing device similarly-situated to the first computing device is part of a community comprising a plurality of mobile computing devices within a defined spatial proximity of one another.

In Example 62, the subject matter of any one or more of Examples 56-61 optionally include wherein the second mobile computing device similarly-situated to the first computing device is part of a community comprising a plurality of mobile computing devices within a defined spatial proximity of one another and having similar reported context according to applied context similarity criteria.

In Example 63, the subject matter of any one or more of Examples 56-62 optionally include wherein the community context information includes context information derived from a plurality of individual context determinations by a plurality of similarly-situated mobile computing devices.

In Example 64, the subject matter of any one or more of Examples 56-63 optionally include wherein the community context information includes context information selected from among plurality of individual context determinations by the plurality of similarly-situated mobile computing devices based on respective confidence level determinations of the individual context determinations.

In Example 65, the subject matter of any one or more of Examples 56-64 optionally include wherein the community context information includes confidence scoring of the remote context determination.

In Example 66, the subject matter of any one or more of Examples 56-65 optionally include means for reporting the indication of the current context to the remote community context service in response to a change of location of the first mobile computing device.

In Example 67, the subject matter of any one or more of Examples 56-66 optionally include means for reporting indication of the current context to the remote community context service in response to a change in the current indication of the current context of the first mobile computing device.

In Example 68, the subject matter of any one or more of Examples 56-67 optionally include wherein the indication of the current context is stored as a state vector.

Example 69 is an apparatus for providing community context service for mobile computing devices, the apparatus comprising: means for storing reported context received from a plurality of remote mobile computing devices; means for classifying the remote mobile computing devices into a plurality of ad-hoc communities based on reported current locations of the remote mobile computing devices; means for receiving a community-context request from a first mobile computing device; means for classifying the first mobile computing device into a first ad-hoc community of the plurality of ad-hoc communities based on a location of the first mobile computing device; means for retrieving a portion of the reported context that corresponds to a second mobile computing device classified in the first ad-hoc community; and means for sending community-context information to the first mobile device, the community-context information being based on the portion of the reported context.

In Example 70, the subject matter of Example 69 optionally includes wherein the reported context from each of the plurality of remote mobile computing devices represents a current user activity or environment in which that mobile device is used.

In Example 71, the subject matter of any one or more of Examples 69-70 optionally include wherein the reported context from each of the plurality of remote mobile computing devices includes a confidence score.

In Example 72, the subject matter of Example 71 optionally includes means for classifying the remote mobile computing devices into the plurality of ad-hoc communities based further on the confidence score of the reported context from each of the plurality of remote mobile computing devices.

In Example 73, the subject matter of any one or more of Examples 71-72 optionally include means for adjusting the confidence score of the reported context from each of the remote mobile computing devices based on a duration that the remote mobile computing device has been classified in its current ad-hoc community.

Example 74 is a system for determining context in a first mobile computing device, the system comprising hardware including a processor and a data store containing instructions that, when executed, cause the computing hardware to perform a method according to any one of Examples 20-37.

Example 75 is a computer-readable medium containing instructions that, when executed on a computing platform, cause the computing platform to perform the method according to any one of Examples 20-37.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for determining context in a first mobile computing device, the system comprising hardware including a processor and a data store containing instructions that, when executed, cause the computing hardware to implement:
   a context indication manager module to store current context representing a current user activity or environment in which the first mobile computing device is used;
   a decision module to generate a query for transmission to a remote community context service; and
   a communicator module to obtain community context information from the remote community context service, the community context information being based on a remote context determination of a second mobile computing device determined to be similarly situated to the first mobile computing device according to community membership criteria;
   wherein the context indication manager module is to update the indication of the current context based on the community context information.

2. The system of claim 1, wherein the decision module is to generate the query in response to a determined need to obtain community context information.

3. The system of claim 1, further comprising:
   a context detector module to determine the current context based on a plurality of inputs from data capture devices and based on context criteria, the context detector to further assess a confidence score for the current context.

4. The system of claim 3, wherein the decision module is to apply confidence-based decision criteria to the confidence score in order to determine the need to obtain the community context information.

5. The system of claim 3, further comprising:
   a context fusion module to combine the community context information with the determined current context to produce an updated current context indication.

6. The system of claim 3, wherein the data capture devices are sensors of the first mobile computing device, and further comprising:

an input module to obtain sensor data from the plurality of sensors and pass the sensor data to the context detector module.

7. The system of claim 1, wherein the second mobile computing device similarly-situated to the first mobile computing device is part of a community comprising a plurality of mobile computing devices within a defined spatial proximity of one another.

8. The system of claim 1, wherein the second mobile computing device similarly-situated to the first mobile computing device is part of a community comprising a plurality of mobile computing devices within a defined spatial proximity of one another and having similar reported context according to applied context similarity criteria.

9. The system of claim 1, wherein the community context information includes context information derived from a plurality of individual context determinations by a plurality of similarly-situated mobile computing devices.

10. The system of claim 1, wherein the community context information includes context information selected from among plurality of individual context determinations by the plurality of similarly-situated mobile computing devices based on respective confidence level determinations of the individual context determinations.

11. The system of claim 1, wherein the community context information includes confidence scoring of the remote context determination.

12. The system of claim 1, wherein the context indication manager module is to further report the indication of the current context to the remote community context service in response to a change of location of the first mobile computing device.

13. The system of claim 1, wherein the context indication manager module is to further report the indication of the current context to the remote community context service in response to a change in the current indication of the current context of the first mobile computing device.

14. The system of claim 1, wherein the indication of the current context is stored as a state vector.

15. A method for determining context for a first mobile computing device, the method comprising:
   storing, by the first mobile computing device, current context representing a current user activity or environment in which the first mobile computing device is used;
   generating, by the first mobile computing device, a query for transmission to a remote community context service;
   obtaining, by the first mobile computing device, community context information from the remote community context service, the community context information being based on a remote context determination of a second mobile computing device determined to be similarly situated to the first mobile computing device according to community membership criteria; and
   updating, by the first mobile computing device, the indication of the current context based on the community context information.

16. The method of claim 15, further comprising:
   determining, by the first mobile computing device, the current context based on a plurality of inputs from data capture devices and based on context criteria, and on an assessment of a confidence score for the current context.

17. The method of claim 16, further comprising:
applying, by the first mobile computing device, confidence-based decision criteria to the confidence score in order to determine the need to obtain the community context information.

18. The method of claim 16, further comprising:
combining, by the first mobile computing device, the community context information with the determined current context to produce an updated current context indication.

19. The method of claim 15, further comprising:
reporting, by the first mobile computing device, the indication of the current context to the remote community context service in response to a change of location of the first mobile computing device.

20. The method of claim 15, further comprising:
reporting, by the first mobile computing device, indication of the current context to the remote community context service in response to a change in the current indication of the current context of the first mobile computing device.

21. At least one non-transitory computer-readable storage medium containing instructions that, when executed on computing hardware of a server, cause the server to perform operations comprising:
storing reported context received from a plurality of remote mobile computing devices;
classifying the remote mobile computing devices into a plurality of ad-hoc communities based on reported current locations of the remote mobile computing devices;
receiving a community-context request from a first mobile computing device;
classifying the first mobile computing device into a first ad-hoc community of the plurality of ad-hoc communities based on a location of the first mobile computing device;
retrieving a portion of the reported context that corresponds to a second mobile computing device classified in the first ad-hoc community; and
sending community-context information to the first mobile computing device, the community-context information being based on the portion of the reported context.

22. The at least one non-transitory computer-readable storage medium of claim 21, wherein the reported context from each of the plurality of remote mobile computing devices represents a current user activity or environment in which that mobile device is used.

23. The at least one non-transitory computer-readable storage medium of claim 21, wherein the reported context from each of the plurality of remote mobile computing devices includes a confidence score.

24. The at least one non-transitory computer-readable storage medium of claim 23, further comprising:
instructions for classifying the remote mobile computing devices into the plurality of ad-hoc communities based further on the confidence score of the reported context from each of the plurality of remote mobile computing devices.

25. The at least one non-transitory computer-readable storage medium of claim 23, further comprising:
instructions for adjusting the confidence score of the reported context from each of the remote mobile computing devices based on a duration that the remote mobile computing device has been classified in its current ad-hoc community.

* * * * *